US010908079B2

(12) United States Patent
Asano

(10) Patent No.: US 10,908,079 B2
(45) Date of Patent: Feb. 2, 2021

(54) IMAGE-PROCESSING DEVICE FOR GAS DETECTION, IMAGE-PROCESSING METHOD FOR GAS DETECTION, AND IMAGE-PROCESSING PROGRAM FOR GAS DETECTION

(71) Applicant: KONICA MINOLTA, INC., Tokyo (JP)

(72) Inventor: Motohiro Asano, Osaka (JP)

(73) Assignee: KONICA MINOLTA, INC., Tokyo (JP)

( * ) Notice: Subject to any disclaimer, the term of this patent is extended or adjusted under 35 U.S.C. 154(b) by 92 days.

(21) Appl. No.: 16/301,201

(22) PCT Filed: Jun. 5, 2017

(86) PCT No.: PCT/JP2017/020793
§ 371 (c)(1),
(2) Date: Nov. 13, 2018

(87) PCT Pub. No.: WO2017/213075
PCT Pub. Date: Dec. 14, 2017

(65) Prior Publication Data
US 2020/0041406 A1 Feb. 6, 2020

(30) Foreign Application Priority Data
Jun. 7, 2016 (JP) .................. 2016-113306

(51) Int. Cl.
*G01N 21/3504* (2014.01)
*G06K 9/20* (2006.01)
(Continued)

(52) U.S. Cl.
CPC .......... *G01N 21/3504* (2013.01); *G01M 3/04* (2013.01); *G06K 9/2054* (2013.01); *G06K 9/4661* (2013.01); *G06K 9/6215* (2013.01)

(58) Field of Classification Search
CPC ..... G01M 3/04; G06K 9/2054; G06K 9/4661; G06K 9/6215; G01N 21/3504
See application file for complete search history.

(56) References Cited

U.S. PATENT DOCUMENTS 5,838,372 A * 11/1998 Wood .................... H04N 5/361
348/312
7,872,756 B2 1/2011 Oda
(Continued)

FOREIGN PATENT DOCUMENTS

JP 2009174990 A 8/2009
JP 2012058093 A 3/2012
(Continued)

OTHER PUBLICATIONS

English translation of the International Preliminary Report on Patentability (IPRP) dated Dec. 11, 2018 issued in counterpart International Application No. PCT/JP2017/020793.
(Continued)

*Primary Examiner* — Santiago Garcia
(74) *Attorney, Agent, or Firm* — Holtz, Holtz & Volek PC

(57) ABSTRACT

An image-processing device, for gas detection that performs image processing on infrared images of a subject being taken at plurality of times a day, includes a hardware processor that generates physical-quantity-change data indicating chronological change in physical quantity determined based on pixel data of pixels constituting the infrared image. The hardware processor selects, from the pixels constituting the infrared image, a reference pixel used as a reference and a comparison pixel to be compared with the reference pixel, and calculates a degree of phase similarity indicating a degree of similarity in phase between a waveform of the physical-quantity-change data of the reference pixel and a waveform of the physical-quantity-change data of the comparison pixel. The hardware processor determines, based on
(Continued)

the degree of phase similarity, that an image including the reference pixel and the comparison pixel is not a gas image.

17 Claims, 22 Drawing Sheets

(51) Int. Cl.
*G06K 9/46* (2006.01)
*G01M 3/04* (2006.01)
*G06K 9/62* (2006.01)

(56) References Cited

U.S. PATENT DOCUMENTS

| | | | | |
|---|---|---|---|---|
| 8,462,983 B2* | 6/2013 | Wolowelsky | ............. | G01J 3/02 |
| | | | | 250/330 |
| 2001/0033683 A1* | 10/2001 | Tanaka | ................... | G06T 7/001 |
| | | | | 382/149 |
| 2005/0049804 A1* | 3/2005 | Ardo | ...................... | G01M 3/38 |
| | | | | 702/51 |
| 2005/0079626 A1* | 4/2005 | Kunz | .................. | G01N 1/2208 |
| | | | | 436/164 |
| 2010/0018289 A1* | 1/2010 | Oda | ...................... | G01J 5/0014 |
| | | | | 73/25.05 |
| 2014/0362226 A1* | 12/2014 | Xu | .......................... | G01M 3/38 |
| | | | | 348/164 |
| 2016/0238451 A1* | 8/2016 | Zeng | ...................... | G01J 5/0014 |
| 2016/0247375 A1* | 8/2016 | Mills | ..................... | G08B 17/125 |
| 2017/0292917 A1* | 10/2017 | O'Dell | ..................... | G01J 5/047 |
| 2019/0003919 A1* | 1/2019 | Asano | ................... | G06T 7/0004 |
| 2019/0266869 A1* | 8/2019 | Mills | ...................... | G06K 9/6202 |
| 2019/0325587 A1* | 10/2019 | Asano | ........................ | G06T 7/00 |

FOREIGN PATENT DOCUMENTS

| | | | |
|---|---|---|---|
| WO | 2017104607 A1 | 6/2017 | |
| WO | 2017104617 A1 | 6/2017 | |

OTHER PUBLICATIONS

International Search Report (ISR) dated Aug. 22, 2017 issued in International Application No. PCT/JP2017/020793.
Written Opinion dated Aug. 22, 2017 issued in International Application No. PCT/JP2017/020793.

* cited by examiner

IMAGE I1
(INFRARED IMAGE)

IMAGE I2
(INFRARED IMAGE)

IMAGE I2　　　　　IMAGE I9　　　　　IMAGE I10
(INFRARED IMAGE)　(STANDARD DEVIATION)　(BINARIZED)

IMAGE I10
(BINARIZED)

IMAGE I10
(BINARIZED)

IMAGE I14
(ABSOLUTE VALUE SUM)

IMAGE I1
(INFRARED IMAGE)

IMAGE I2
(INFRARED IMAGE)

IMAGE I15
(DEGREE OF PHASE SIMILARITY)

IMAGE I16
(DEGREE OF PHASE SIMILARITY)

IMAGE-PROCESSING DEVICE FOR GAS DETECTION, IMAGE-PROCESSING METHOD FOR GAS DETECTION, AND IMAGE-PROCESSING PROGRAM FOR GAS DETECTION

TECHNICAL FIELD

The present invention relates to a technique of gas detection using an infrared image.

BACKGROUND ART

Gas leakage causes a slight increase in temperature in a region where leaked gas exists. The technique of detecting the gas using this principle includes a known gas detection technique using an infrared image.

Regarding the gas detection using an infrared image, for example, Patent Literature 1 discloses a gas leakage detecting device that includes an infrared camera that captures an image of an area to be inspected, and an image processing unit that processes an infrared image being taken by the infrared camera, in which the image processing unit includes a fluctuation extraction unit that extracts dynamic fluctuation caused by the leaked gas from a plurality of chronologically arranged infrared images.

The present inventor has found that, in the gas detection using an infrared image, an object reflecting the sunlight or an object reflecting heat from a heat source may be mistakenly detected as gas.

CITATION LIST

Patent Literature

Patent Literature 1: JP 2012-58093 A

SUMMARY OF INVENTION

An object of the present invention is to provide an image-processing device for gas detection, an image-processing method for gas detection, and a computer-readable recording medium having image-processing program for gas detection recorded thereon that provides improved gas detection accuracy.

To achieve the above object, an image-processing device for gas detection according to a first aspect of the present invention is an image-processing device for gas detection that performs image processing on infrared images of a subject being taken at a plurality of times of day, and includes a first calculation unit, a second calculation unit, and a determination unit. The first calculation unit generates physical-quantity-change data indicating the chronological change in physical quantity determined based on pixel data of pixels constituting the infrared image. The second calculation unit selects, from the pixels constituting the infrared image, a reference pixel used as a reference and a comparison pixel to be compared with the reference pixel, and calculates a degree of phase similarity indicating a degree of similarity in phase between a waveform of the physical-quantity-change data of the reference pixel and a waveform of the physical-quantity-change data of the comparison pixel. The determination unit determines, based on the degree of phase similarity, that an image including the reference pixel and the comparison pixel is not a gas image.

The aforementioned object and other objects, characteristics, and benefits of the present invention will be understood by the details described below and the appended drawings.

DESCRIPTION OF EMBODIMENTS

Figure 1A:
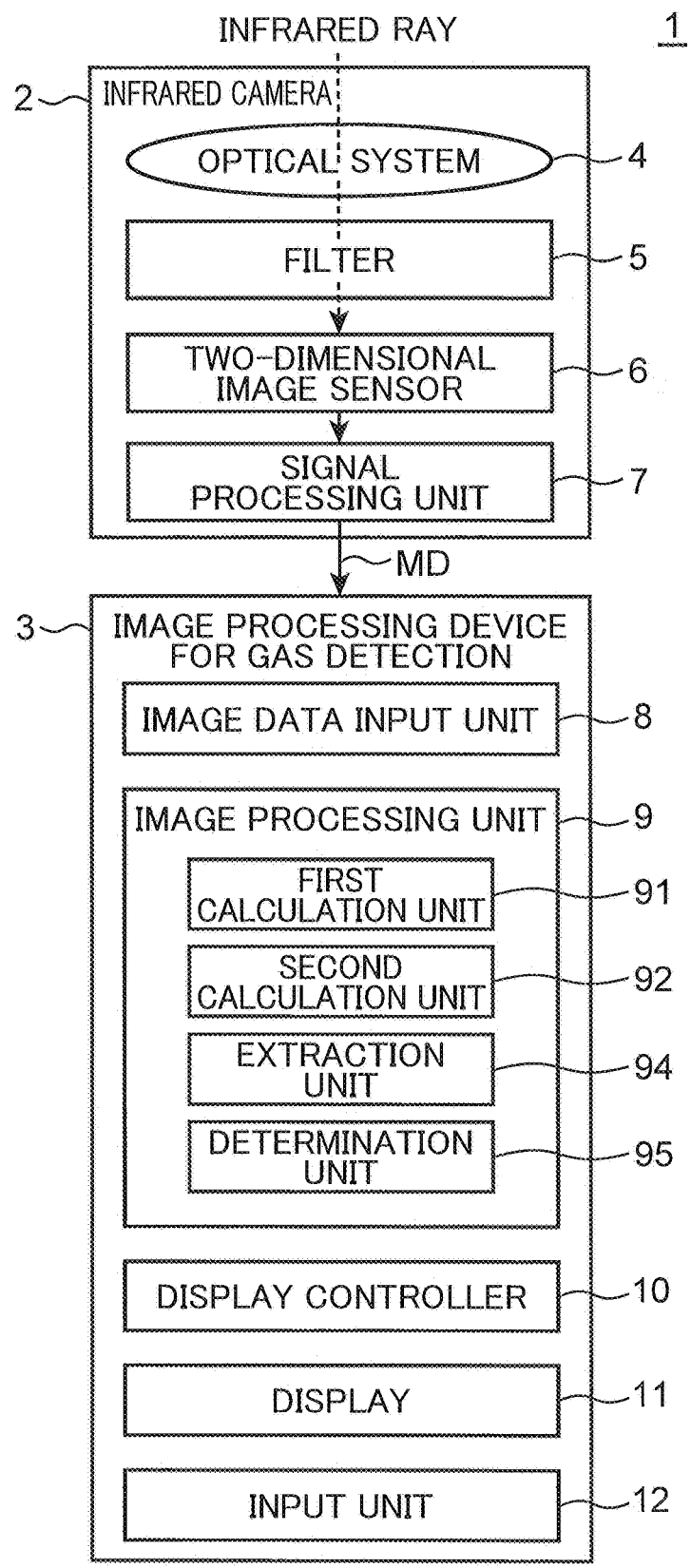
FIG. 1A is a block diagram illustrating a configuration of a gas detection system according to an embodiment.

An embodiment of the present invention will now be described below in detail with reference to the drawings. In the drawings, the component appended with the same reference sign indicates the same component. Description on the component that is already described will be omitted. In the description, a reference sign without a suffix represents a general component while a reference sign with a suffix represents a unique component.

FIG. 1A is a block diagram illustrating a configuration of a gas detection system 1 according to an embodiment. The gas detection system 1 includes an infrared camera 2, and an image-processing device 3 for gas detection.

The infrared camera 2 captures a moving image of an infrared image of a subject including a target to be monitored for gas leakage (for example, a connection between gas pipes), and generates moving image data MD for reproducing the being taken moving image. A moving image is not always required. It may be infrared images of a subject including a subject to be monitored for gas leakage being taken at a plurality of times of day. The infrared camera 2 includes an optical system 4, a filter 5, a two-dimensional image sensor 6, and a signal processing unit 7.

The optical system 4 forms an infrared image of the subject on the two-dimensional image sensor 6. The filter 5 is disposed between the optical system 4 and the two-dimensional image sensor 6. The filter 5 receives the light that has passed through the optical system 4 and allows only an infrared ray having a particular wavelength to pass therethrough. The wavelength band of infrared rays allowed to pass through the filter 5 depends on the type of gas to be detected. In a case of methane, for example, the filter 5 allows the infrared rays within the wavelength band of 3.2 to 3.4 µm to pass therethrough. The two-dimensional image sensor 6 is, for example, an indium antimonide (InSb) cooled image sensor, which receives an infrared ray that has passed through the filter 5. The signal processing unit 7 converts an analog signal that is output from the two-dimensional image sensor 6 into a digital signal and performs known image processing. The digital signal becomes the moving image data MD.

The image-processing device 3 for gas detection is, for example, a personal computer, a smartphone, or a tablet-type terminal and has functional blocks, which are an image data input unit 8, an image processing unit 9, a display controller 10, a display 11, and an input unit 12.

The image data input unit 8 is a communication interface that communicates with a communication unit (not shown) of the infrared camera 2. The moving image data MD transmitted from the communication unit of the infrared camera 2 is input to the image data input unit 8. The image data input unit 8 transmits the moving image data MD to the image processing unit 9.

The image processing unit 9 performs predetermined processing on the moving image data MD. The predetermined processing includes generating chronological pixel data from the moving image data MD.

Figure 2:
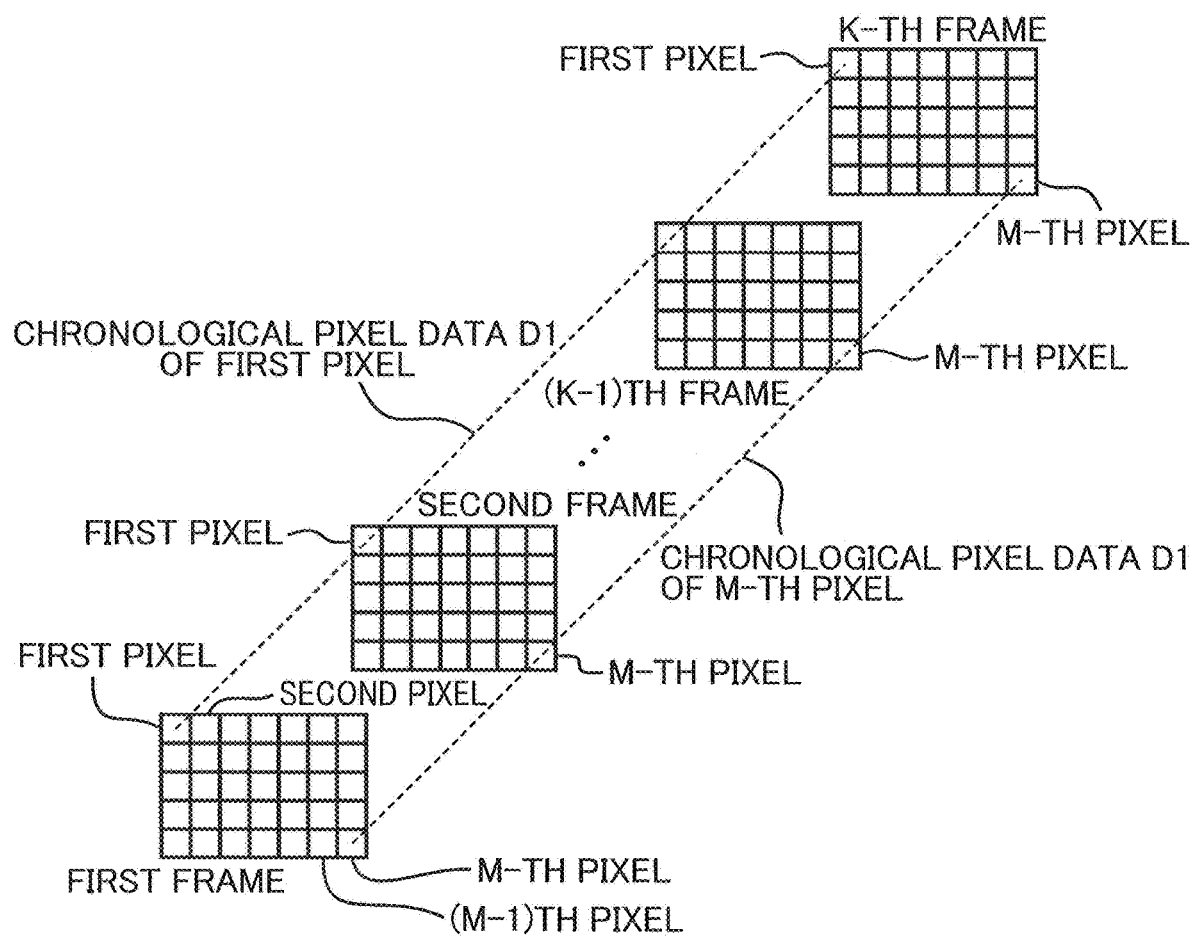
FIG. 2 is an explanatory view for describing chronological pixel data D1.

The moving image reproduced from the moving image data MD includes a plurality of chronologically arranged frames. For a pixel located at a certain location, pieces of pixel data of a plurality of frames (a plurality of infrared images) are chronologically arranged, and this data is referred to as chronological pixel data. The chronological pixel data will now specifically be described. FIG. 2 is an explanatory view for describing chronological pixel data D1. K is the number of the frames in the infrared image moving image. A single frame includes M pixels, which are the first pixel, the second pixel, . . . , the (M−1)th pixel, and M-th pixel. A physical quantity, such as brightness or temperature, is determined from the pixel data (pixel value).

Pixels at the same location among a plurality of (K) frames are given the same number of order. Describing the first pixel, for example, the chronological pixel data D1 of the first pixel includes the pixel data of the first pixel included in the first frame, the pixel data of the first pixel included in the second frame, . . . , the pixel data of the first pixel included in the (K−1)th frame, and the pixel data of the first pixel included in the K-th frame, where these pieces of pixel data are arranged in the chronological order. Describing the M-th pixel, the chronological pixel data D1 for the M-th pixel includes the pixel data of the M-th pixel included in the first frame, the pixel data of the M-th pixel included in the second frame, . . . , the pixel data of the M-th pixel included in the (K−1)th frame, and the pixel data of the M-th pixel included in the K-th frame, where these pieces of pixel data are arranged in the chronological order. The number of pieces of the chronological pixel data D1 is the same as the number of pixels constituting a single frame.

Now, FIG. 1A will be referred again. The image processing unit 9 includes a first calculation unit 91, a second calculation unit 92, an extraction unit 94, and a determination unit 95. These components will be described later.

The display controller 10 presents moving images reproduced from the moving image data MD on the display 11.

The input unit 12 receives inputs related to gas detection. The image-processing device 3 for gas detection according to the embodiment includes, but not necessarily, the display controller 10, the display 11, and the input unit 12.

Figure 1B:
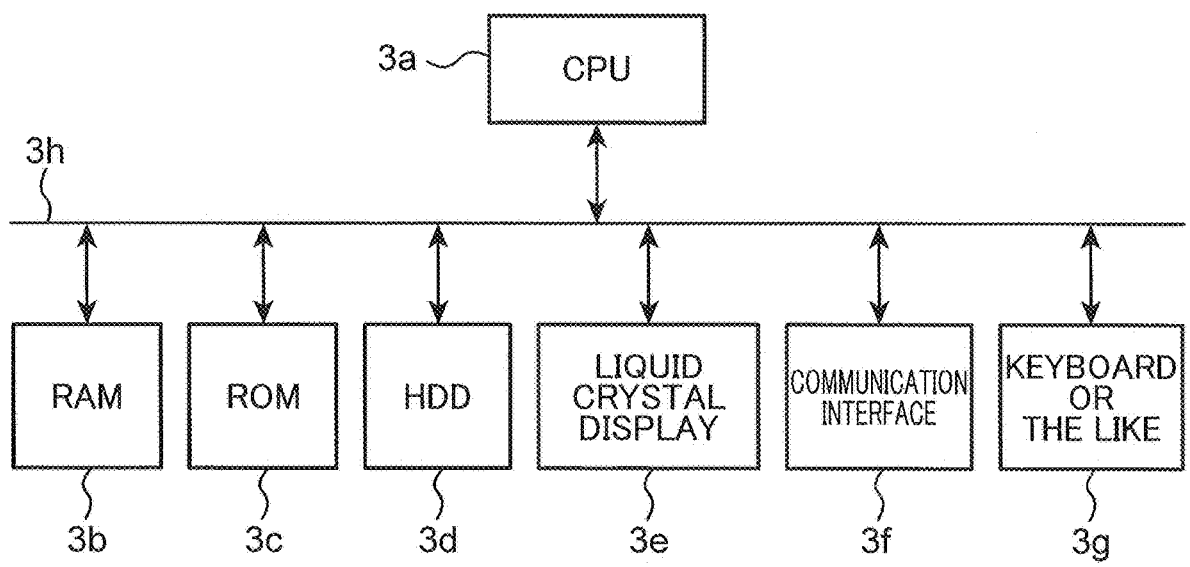
FIG. 1B is a block diagram illustrating a hardware configuration of an image-processing device for gas detection illustrated in FIG. 1A.

FIG. 1B is a block diagram illustrating a hardware configuration of an image-processing device 3 for gas detection illustrated in FIG. 1A. The image-processing device 3 for gas detection includes a central processing unit (CPU) 3a, a random access memory (RAM) 3b, a read only memory (ROM) 3c, a hard disk drive (HDD) 3d, a liquid crystal display 3e, a communication interface 3f, a keyboard device 3g, and a bus 3h connecting these components. The liquid crystal display 3e is a hardware component serving as the display 11. An organic light emitting diode display, a plasma display, or the like may be used instead of the liquid crystal display 3e. The communication interface 3f is a hardware component serving as the image data input unit 8. The keyboard device 3g serves as the input unit 12. A touch panel may be used instead of a keyboard.

The HDD 3d stores programs for operating the image processing unit 9 and the display controller 10 for realizing the respective functional blocks, and data of certain types (for example, the moving image data MD). The program that serves as the image processing unit 9 is an image-processing program that obtains the moving image data MD (image data) and performs the predetermined processing on the moving image data MD. The program serving as the display controller 10 is a display control program that, for example, presents a moving image reproduced from the moving image data MD on the display 11 or presents a moving image, on which the predetermined processing has been performed by the image processing unit 9, on the display 11. These programs are previously stored, but not necessarily, in the HDD 3d. For example, a storage media storing the program (for example, an external storage media like a magnetic disc or an optical disk) may be provided, and the program may be stored in the HDD 3d. The program may be stored in a server connected via a network to the image-processing device 3 for gas detection so that the program is transmitted to the HDD 3d via the network and stored in the HDD 3d. The program may be stored in the ROM 3c instead of the HDD 3d. The image-processing device 3 for gas detection may include a flash memory instead of the HDD 3d and store the program in the flash memory.

The CPU 3a reads the program from the HDD 3d and writes the program in the RAM 3b. The CPU 3a executes the program written in the RAM 3b to operate the image processing unit 9 and the display controller 10. Functions of the image processing unit 9 and the display controller 10 may partially or entirely be realized by processing performed by a digital signal processor (DSP) instead of or together with the processing performed by the CPU 3a. Likewise, the functions may partially or entirely be realized by processing performed by a dedicated hardware circuit instead of or together with processing performed by software.

The image-processing device 3 for gas detection includes components, which are a first calculation unit 91, a second calculation unit 92, an extraction unit 94, and a determination unit 95. The HDD 3d stores programs for operating the components. The programs are represented as a first calculation program, a second calculation program, an extraction program, and a determination program.

Each of the programs is represented by each definition of the component. The first calculation unit 91 and the first calculation program as well as the second calculation unit 92 and the second calculation program will be described as examples. The first calculation unit 91 generates physical-quantity-change data indicating the chronological change in physical quantity determined based on pixel data of pixels constituting the infrared image. The first calculation program generates the physical-quantity-change data indicating the chronological change in the physical quantity determined based on the pixel data of pixels constituting the infrared image. The second calculation unit 92 selects, from the pixels constituting the infrared image, a reference pixel used as a reference and a comparison pixel to be compared with the reference pixel, and calculates a degree of phase similarity indicating a degree of similarity in phase between a waveform of the physical-quantity-change data of the reference pixel and a waveform of the physical-quantity-change data of the comparison pixel. The second calculation program selects, from the pixels constituting the infrared image, the reference pixel used as the reference and the comparison pixel to be compared with the reference pixel, and calculates the degree of phase similarity indicating a degree of similarity in phase between the waveform of the physical-quantity-change data of the reference pixel and the waveform of the physical-quantity-change data of the comparison pixel. The first calculation program and the second calculation program may be provided as a single calculation program having both the functions instead of being provided as independent programs as described above.

Figure 11:
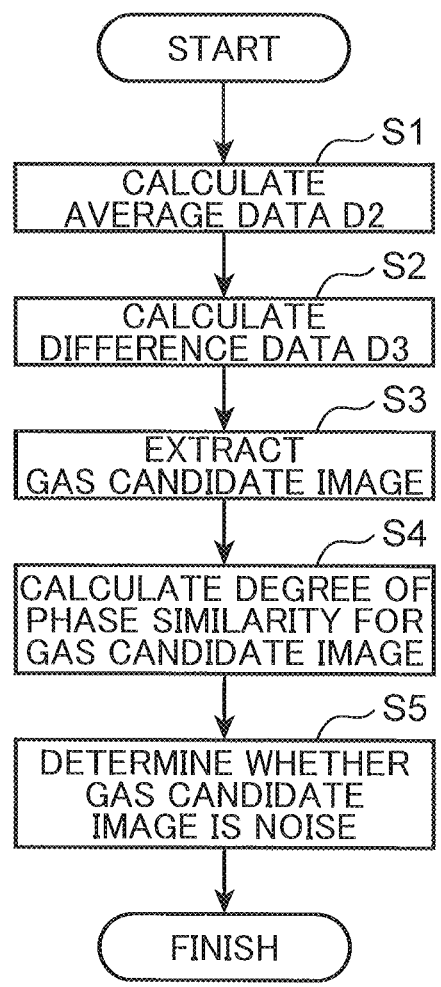
FIG. 11 is a flowchart describing an operation of the image-processing device for gas detection according to the embodiment.

FIG. 11, which will be described later, illustrates a flowchart of the programs executed by the CPU 3a (the first calculation program, the second calculation program, the extraction program, and the determination program) and will be described later.

The physical-quantity-change data indicates the chronological change in physical quantity determined based on the pixel data of pixels constituting the infrared image. An example physical quantity described in the embodiment is brightness. However, the physical quantity is not limited to brightness and may be, for example, temperature. The chronological pixel data D1 described in FIG. 2 is an example of physical-quantity-change data.

The present inventor has compared the waveform of the physical-quantity-change data among the pixels constituting a gas image (an image indicating gas) and found out that the waveform have no similarity in phase. The present inventor has also compared the waveform of the physical-quantity-change data among the pixels of an image of an object reflecting the sunlight or heat from a heat source (an object such as a tank of a plant) and found out that the waveform have similarity in phase. The degree of phase similarity is high for the image of the object reflecting the sunlight or heat from a heat source, whereas the degree of phase similarity is low for the gas image. This will be described below.

Figure 3:
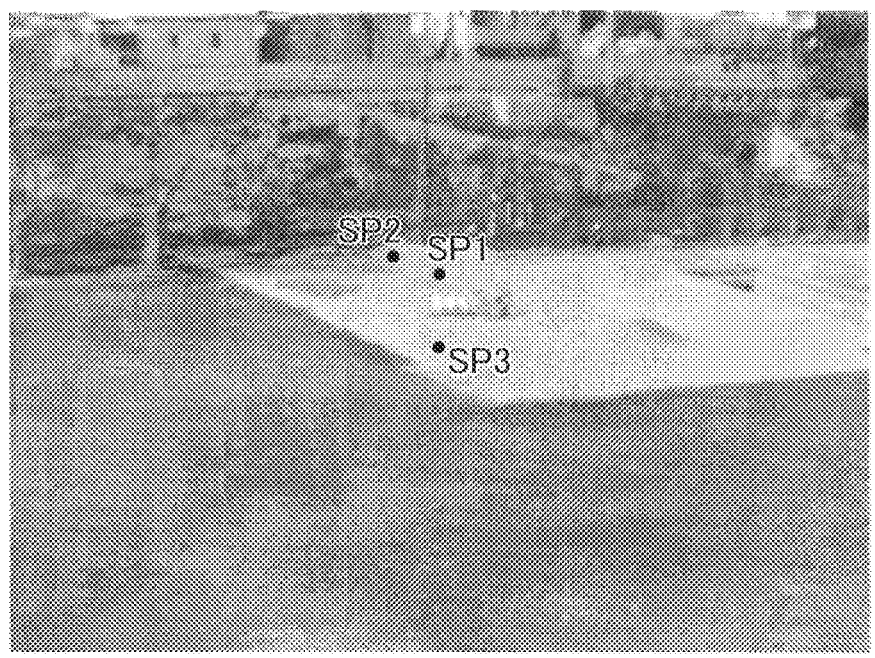
FIG. 3 illustrates an image I1 in which an outdoor testing area is taken as a subject.
Figure 4:
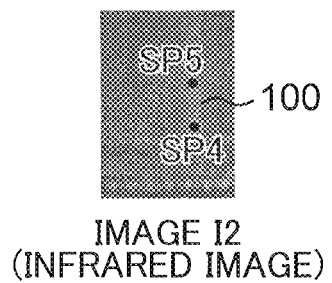
FIG. 4 illustrates an image I2 in which a subject including an object reflecting the sunlight is taken.

FIG. 3 illustrates an image I1 in which an outdoor testing area is taken as a subject. The image I1 is an infrared image. Gas comes out at spots SP1 and SP2 in the testing area. A spot SP3, where no gas exists, is shown for comparison. FIG. 4 illustrates an image I2 in which a subject including an object reflecting the sunlight is taken. The image I2 is an infrared image. An image of the object is an object image 100. The object has a curved face. Two spots SP4 and SP5 on the curved face are indicated. No gas comes out nor exists at the spots SP4 and SP5. The spots SP1 to SP5 each corresponds to a pixel of the infrared image.

Figure 5:
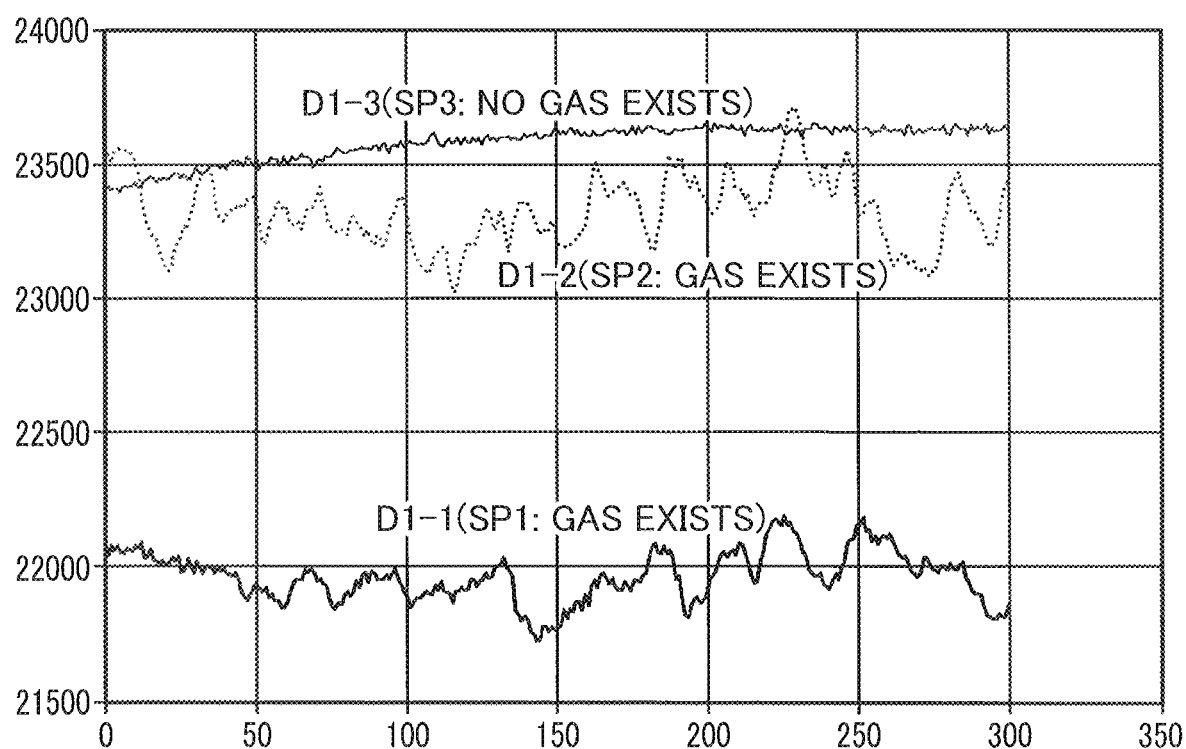
FIG. 5 is a chart illustrating chronological pixel data D1-1 of a pixel corresponding to a spot SP1, chronological pixel data D1-2 of a pixel corresponding to a spot SP2, and chronological pixel data D1-3 of a pixel corresponding to a spot SP3.
Figure 6:
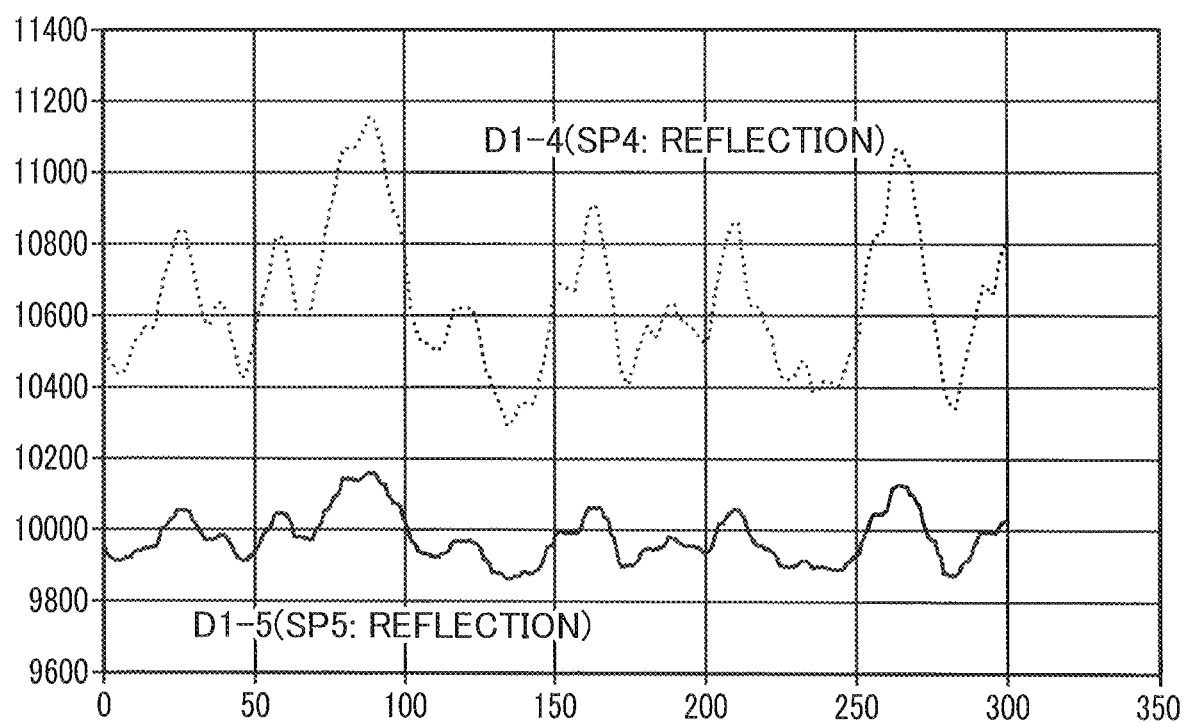
FIG. 6 is a chart illustrating chronological pixel data D1-4 of a pixel corresponding to a spot SP4, and chronological pixel data D1-5 of a pixel corresponding to a spot SP5.

FIG. 5 is a chart illustrating chronological pixel data D1-1 of a pixel corresponding to the spot SP1, chronological pixel data D1-2 of a pixel corresponding to the spot SP2, and chronological pixel data D1-3 of a pixel corresponding to the spot SP3. FIG. 6 is a chart illustrating chronological pixel data D1-4 of a pixel corresponding to the spot SP4, and chronological pixel data D1-5 of a pixel corresponding to the spot SP5. In FIGS. 5 and 6, the vertical axis of the chart represents the pixel data (pixel value) and the horizontal axis of the chart represents the order of the frames. The pixel data is 16-bit data indicating brightness.

The chronological pixel data D1 is an example physical-quantity-change data as described above. The chronological pixel data D1-1, the chronological pixel data D1-2, and the chronological pixel data D1-3 are obtained from the moving image including the image I1 illustrated in FIG. 3. The chronological pixel data D1-4 and the chronological pixel data D1-5 are obtained from the moving image including the image I2 illustrated in FIG. 4 The frame rate of both the moving images is 30 fps.

The chronological pixel data D1-1 and the chronological pixel data D1-2 show a greater change in the waveform amplitude (that is, the change in brightness) than the chronological pixel data D1-3. This is because the chronological pixel data D1-1 and the chronological pixel data D1-2 are data of the spot SP1 and data of the spot SP2, respectively, where gas comes out, whereas the chronological pixel data D1-3 is data of the spot SP3 where no gas exists.

The chronological pixel data D1-4 and the chronological pixel data D1-5 show a greater change in the waveform amplitude than the chronological pixel data D1-3. This is because the spots SP4 and SP5 are located on the surface (curved face) of the object and the light (heat) reflected on the object fluctuates. The fluctuation occurs when a cloud moves and blocks the sunlight or the cloud blocking the sunlight goes away, and the light amount incident on the surface (curved face) of the object changes, causing the change in pseudo temperature.

The waveform of the chronological pixel data D1-1 and the waveform of the chronological pixel data D1-2 look dissimilar in phase. The gas gradually spreads with time over the surroundings of the spot where gas comes out, and thus the change in brightness gradually propagates in the surroundings of the spot where gas comes out. The change in the waveform of the chronological pixel data D1-1 is not in synchronization with the change in the waveform of the chronological pixel data D1-2, and thus the waveforms are dissimilar in phase.

In contrast, the waveform of the chronological pixel data D1-4 and the waveform of the chronological pixel data D1-5 look similar in phase. The light (heat) reflected on the object is easily affected by the change in the sunlight or the change in the heat source nearby (namely, often affected by the light reflected on the object or the change in a single light source or heat source). The change in the waveform of the chronological pixel data D1-4 is in synchronization with the change in the waveform of the chronological pixel data D1-5 (the timing of the maximum value as well as the timing of the minimum value are in synchronization among the waves), and thus the waveforms are similar in phase.

Dissimilarity in waveform phase between the chronological pixel data D1-1 and the chronological pixel data D1-2 and similarity in waveform phase between the chronological pixel data D1-4 and the chronological pixel data D1-5 will be described. In the embodiment, comparison is made not for the chronological pixel data D1 but for difference data D3. The reason for this will be described later. The difference data D3 indicates the difference (at the same time of day) between the chronological pixel data D1 and the average data D2 extracted from the chronological pixel data D1 (an example smoothed data). The difference data D3 indicates a fluctuation component of the chronological pixel data D1. The difference data D3 is an example physical-quantity-change data. Calculation of the difference data D3 will be described for the chronological pixel data D1-2 as an example.

Figure 7:
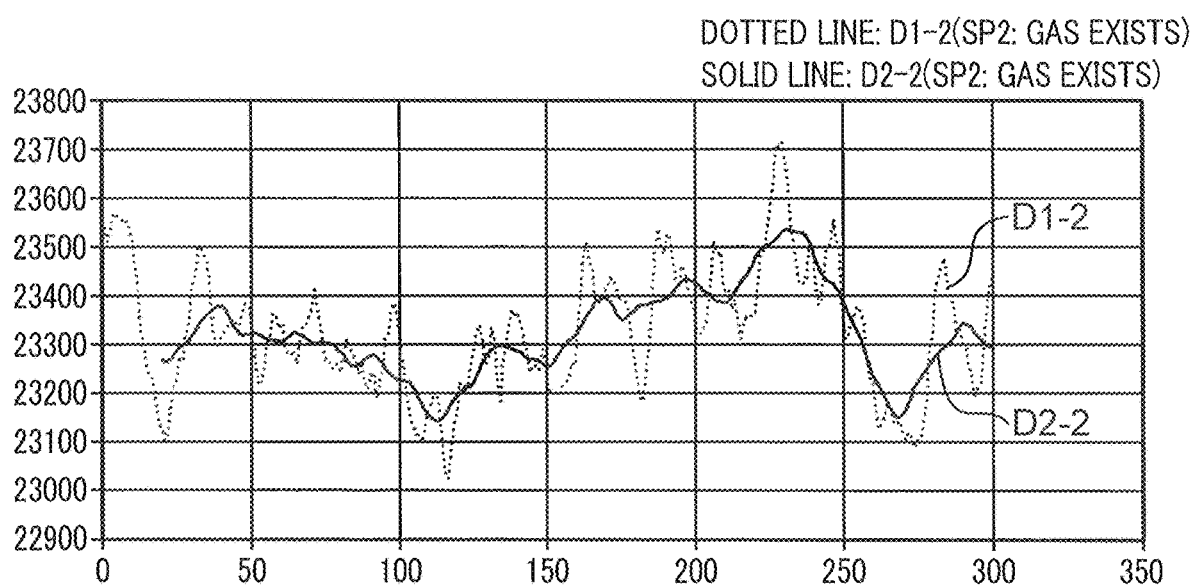
FIG. 7 is a chart illustrating chronological pixel data D1-2 and average data D2-2 of D1-2.
Figure 8:
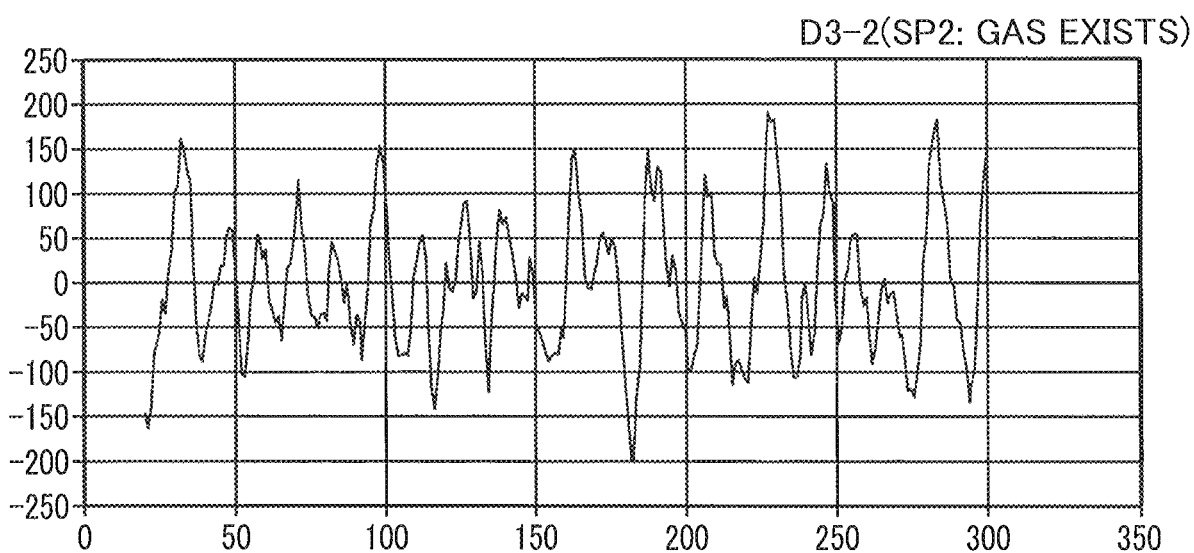
FIG. 8 is a chart illustrating difference data D3-2.

FIG. 7 is a chart illustrating the chronological pixel data D1-2 and the average data D2-2. FIG. 8 is a chart illustrating the difference data D3-2. In the charts illustrated in FIGS. 7 and 8, the vertical axis and the horizontal axis are respectively the same as the vertical axis and the horizontal axis of the chart illustrated in FIG. 5.

In FIG. 7, the average data D2-2 is a simple moving average taken for 21 frames. The 21 frames include a target frame, ten frames being taken in series before the target frame, and ten frames being taken in series after the target frame. The average data D2 is an example smoothed data. The smoothed data indicates a waveform resulting from smoothing the chronological pixel data D1 along the time axis.

The description is made for the case where 21 frames are used for calculating the moving average. If the number of frames is too small, the waveform of the average data D2 is almost the same as the waveform of the chronological pixel data D1. If the number of frames is too large, the waveform of the average data D2 takes a flat shape. The number of frames used for calculating the moving average is selected such that the difference data D3 takes a positive maximum value and a negative minimum value (for example, 15 frames to 50 frames).

In FIG. 8, the difference data D3-2 indicates the difference between the chronological pixel data D1-2 and the average data D2-2 illustrated in FIG. 7. The difference data D3-2, taking a positive maximum value and a negative minimum value, indicates the fluctuation component of the chronological pixel data D1-2.

It can be easily determined whether the waveforms are similar or dissimilar in phase by comparing fluctuation components. There are timings when the fluctuation component changes from positive to negative, changes from negative to positive, takes a maximum value, and takes a minimum value. If the fluctuation components of the two waveforms are the same (or approximately the same), it can be determined that the waveforms are similar in phase. If the fluctuation components are different, it can be determined that the waveforms are dissimilar in phase.

Figure 9:
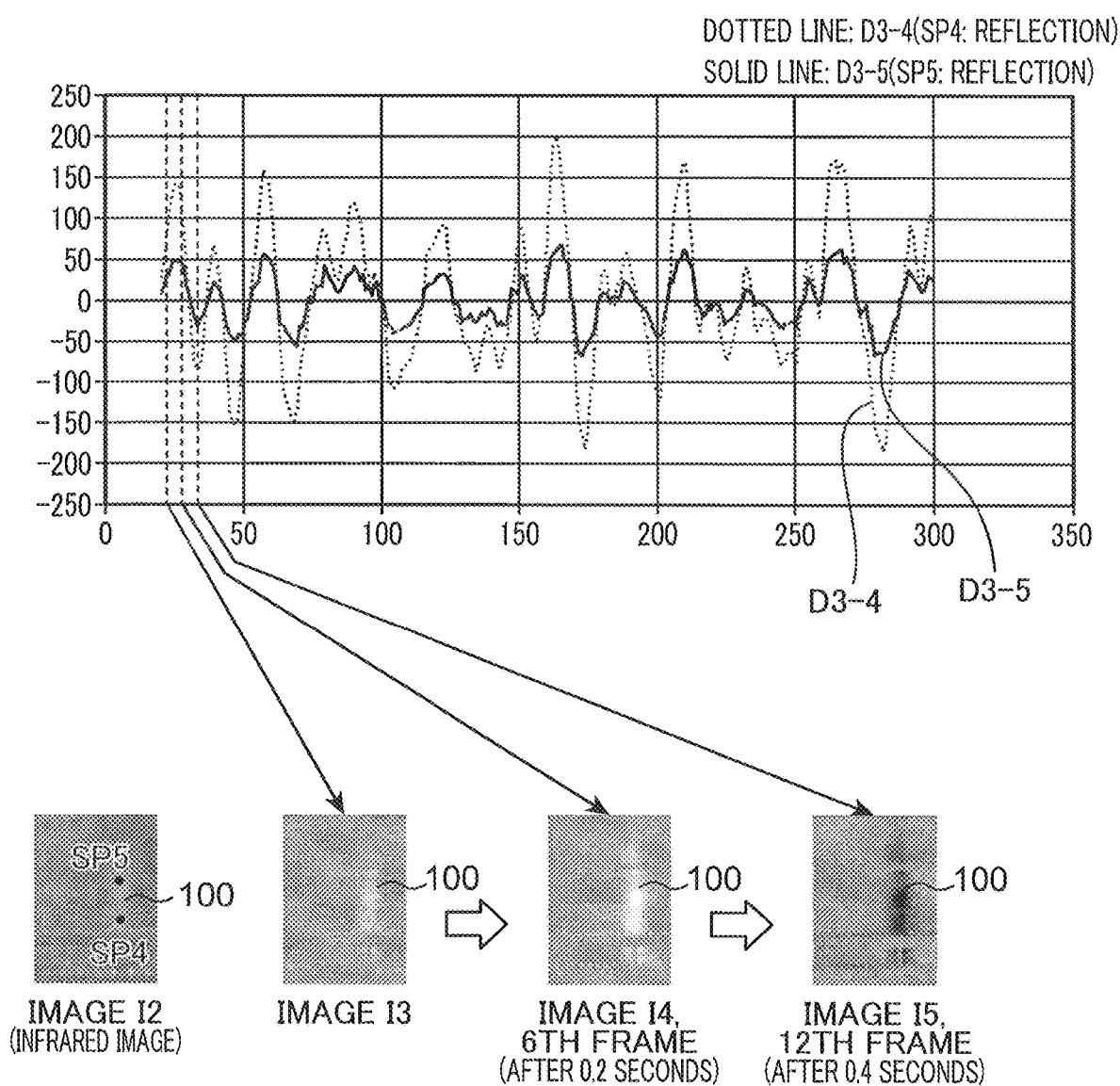
FIG. 9 is a chart illustrating difference data D3-4 and difference data D3-5.
Figure 10:
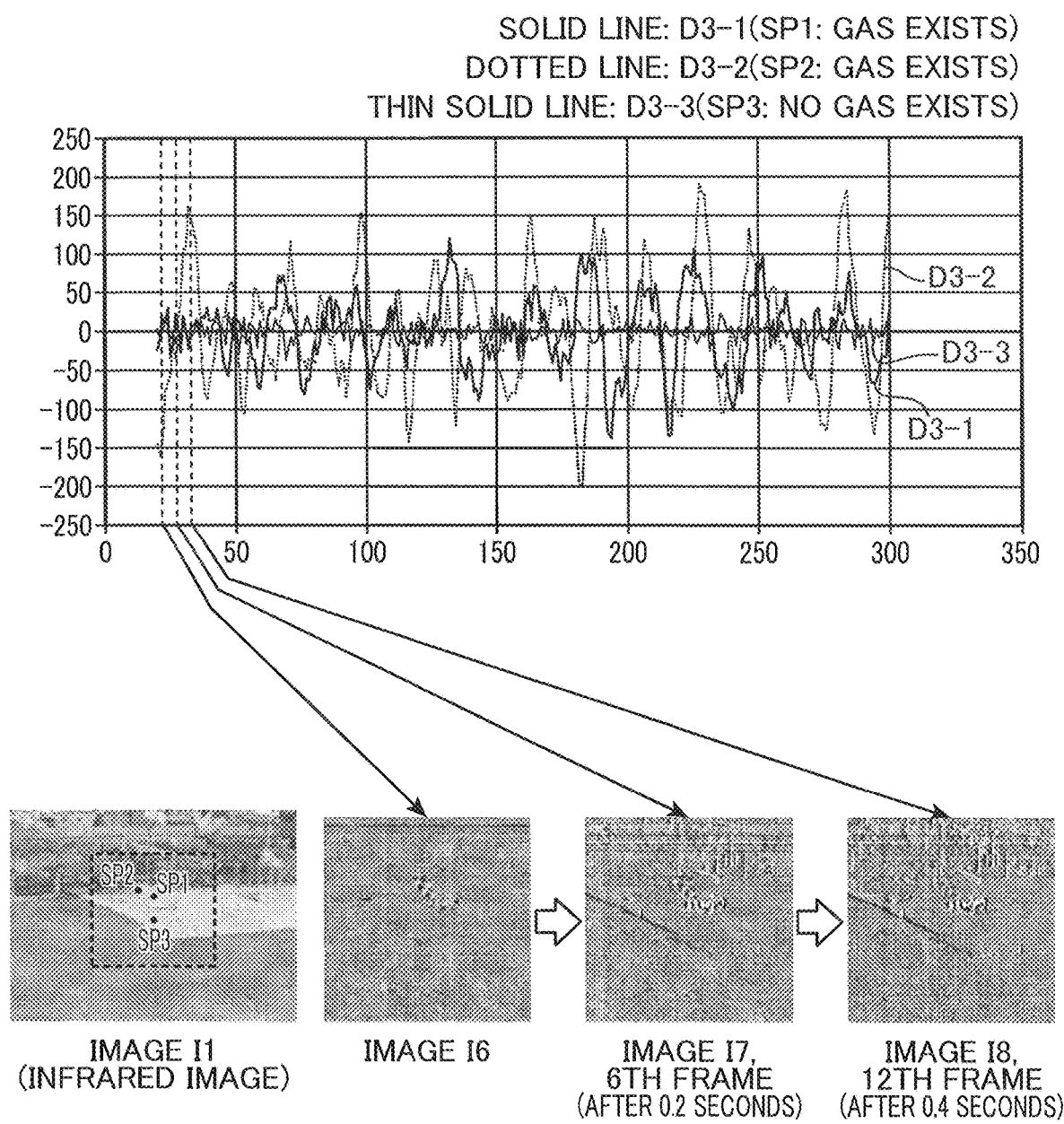
FIG. 10 is a chart illustrating difference data D3-1, difference data D3-2, and difference data D3-3.

FIG. 9 is a chart illustrating difference data D3-4 and difference data D3-5. FIG. 10 is a chart illustrating difference data D3-1, difference data D3-2, and difference data D3-3. In the charts illustrated in FIGS. 9 and 10, the vertical axis and the horizontal axis are respectively the same as the vertical axis and the horizontal axis of the chart illustrated in FIG. 5. The difference data D3-1 is the difference data D3 corresponding to the chronological pixel data D1-1 (FIG. 5). The difference data D3-2 is the difference data D3 corresponding to the chronological pixel data D1-2 (FIG. 5). The difference data D3-3 is the difference data D3 corresponding to the chronological pixel data D1-3 (FIG. 5). The difference data D3-4 is the difference data D3 corresponding to the chronological pixel data D1-4 (FIG. 6). The difference data D3-5 is the difference data D3 corresponding to the chronological pixel data D1-5 (FIG. 6).

In FIG. 9, an image I3, an image I4, and an image I5 correspond to the image I2 illustrated in FIG. 4. The value of each of the pixels constituting the image I3, the image I4, and the image I5 is the difference value of the pixel data (pixel value). The image I3, the image I4, and the image I5 are visualization of the difference values. The image I3 shows the difference data D3 of the first frame. The image I4 shows the difference data D3 of the sixth frame. The image I5 shows the difference data D3 of the 12th frame. Regarding the gray scale of the image I3, the image I4, and the image I5, the difference value is larger for a scale closer to white and smaller for a scale closer to black. The scale is gray when the difference value is zero or approximate zero.

Comparing the difference data D3-4 and the difference data D3-5, the timing of the change from positive to negative, the timing of the change from negative to positive, the timing when a maximum value takes place, and the timing when a minimum value takes place are the same or almost the same. Thus, the difference data D3-4 and the difference data D3-5 have similar waveform phases (the chronological pixel data D1-4 and the chronological pixel data D1-5 illustrated in FIG. 6 have similar waveform phases). This means that the gray scale of the object image 100 changes at the same timing. This is shown in the image I3, the image I4, and the image I5. The object image 100 is shown in gray in the image I3 (the first frame). The object image 100 is shown in white in the image I4 (the sixth frame). The object image 100 is shown in black in the image I5 (the 12th frame).

In FIG. 10, an image I6, an image I7, and an image I8 correspond to a region shown by a dotted line in the image I1 illustrated in FIG. 10. The value of each of the pixels constituting the image I6, the image I7, and the image I8 is the difference value of the pixel data (pixel value). The image I6, the image I7, and the image I8 are visualization of the difference values. The image I6 shows the difference data D3 of the first frame. The image I7 shows the difference data D3 of the sixth frame. The image I8 shows the difference data D3 of the 12th frame. Regarding the gray scale of the image I6, the image I7, and the image I8, the difference value is larger for a scale closer to white and smaller for a scale closer to black. The scale is gray when the difference value is zero or approximate zero.

Comparing the difference data D3-1 and the difference data D3-2, the timing of the change from positive to negative, the timing of the change from negative to positive, the timing when a maximum value takes place, and the timing when a minimum value takes place are different. Thus, the difference data D3-1 and the difference data D3-2 have dissimilar waveform phases (the chronological pixel data D1-1 and the chronological pixel data D1-2 illustrated in FIG. 5 have dissimilar waveform phases). This means that the gray scale changes at different timings. This is shown in the image I6, the image I7, and the image I8. There is no image that shows the change in gray scale occurring at the same timing throughout the image.

Dissimilarity in waveform phase between the difference data D3-1 and the difference data D3-2 illustrated in FIG. 10

(the chronological pixel data D1-1 and the chronological pixel data D1-2 illustrated in FIG. 5) and similarity in waveform phase between the difference data D3-4 and the difference data D3-5 illustrated in FIG. 9 (the chronological pixel data D1-4 and the chronological pixel data D1-5 illustrated in FIG. 6) will be described below using a value (degree of phase similarity).

The degree of similarity in waveform phase (hereinafter referred to as degree of phase similarity) is indicated by, for example, normalized cross correlation (NCC). The NCC is calculated by Equation 1.

[Formula 1]

$$\cos\theta = \frac{\overrightarrow{X(t)} \cdot \overrightarrow{Y(t)}}{|\overrightarrow{X(t)}||\overrightarrow{Y(t)}|} \quad \text{Equation 1}$$

Vector $X(t)$ is $(Xt0, Xt1, Xt2, \ldots, Xtn)$ and vector $Y(t)$ is $(Yt0, Yt1, Yt2, \ldots, Ytn)$. Here, $t0, t1, t2, \ldots,$ and $tn$ indicate a time of day. Assuming that $\theta$ is the angle between the vector $X(t)$ and the vector $Y(t)$, $\cos\theta$ is the NCC. The NCC takes a value within the range from $-1$ to $+1$. The NCC is zero if the vector $X(t)$ and the vector $Y(t)$ have no correlation with each other. The NCC takes a value closer to $+1$ for a stronger positive correlation between the vector $X(t)$ and the vector $Y(t)$. The NCC takes a value closer to $-1$ for a stronger negative correlation between the vector $X(t)$ and the vector $Y(t)$. As the NCC takes a value closer to $+1$, the degree of similarity in phase between the waveform of the vector $X(t)$ and the waveform of the vector $Y(t)$ becomes stronger. The NCC taking a value closer to $+1$ means that the angle $\theta$ takes a value closer to zero.

Equation 2 is actually used instead of Equation 1 to calculate the NCC. Equation 2 is another form of Equation 1 with components of the vectors expanded.

[Formula 2]

$$NCC = \frac{\sum_{i=0}^{n} Xti Yti}{\sqrt{\sum_{i=0}^{n} Xti^2} \sqrt{\sum_{i=0}^{n} Yti^2}} \quad \text{Equation 2}$$

The difference data D3-1 and the difference data D3-2 illustrated in FIG. 10 are the vector $X(t)$ and the vector $Y(t)$, respectively. The difference data D3-4 and the difference data D3-5 illustrated in FIG. 9 are the vector $X(t)$ and the vector $Y(t)$, respectively. The components of the vector $X(t)$ and the vector $Y(t)$ are difference values of the pixel data of the frames (difference values of brightness). In a case where the number of frames is 300, for example, the vector $X(t)$ and the vector $Y(t)$ are each a vector of 300 dimensions.

The NCC between the difference data D3-1 and the difference data D3-2 is $-0.04$. The NCC between the difference data D3-4 and the difference data D3-5 is $+0.985$. From a view point of the degree of similarity of correlation, it can be understood that the difference data D3-1 and the difference data D3-2 (the chronological pixel data D1-1 and the chronological pixel data D1-2) have dissimilar waveform phases, and the difference data D3-4 and the difference data D3-5 (the chronological pixel data D1-4 and the chronological pixel data D1-5) have similar waveform phases.

The NCC may be calculated by Equation 3 instead of Equation 2. Equation 3 expresses zero-mean normalized cross correction (ZNCC). Equation 3 includes a term for cancelling the average value.

[Formula 3]

$$ZNCC = \frac{\sum_{i=0}^{n} (Xti - Xtave)(Yti - Ytave)}{\sqrt{\sum_{i=0}^{n} (Xti - Xtave)^2} \sqrt{\sum_{i=0}^{n} (Yti - Ytave)^2}} \quad \text{Equation 3}$$

The equation for calculating the degree of phase similarity is not only the equation for calculating NCC but may be an equation for calculating the degree of similarity in waveform phase.

A high degree of phase similarity is observed not only for the light (heat) reflected on an object but for a stray light occurring in an optical system 4 of an infrared camera 2 illustrated in FIG. 1A. If the degree of phase similarity is high, the embodiment performs processing assuming that no gas is detected but a noise is detected.

FIG. 11 is a flowchart describing an operation of the image-processing device 3 for gas detection according to the embodiment illustrated in FIG. 1A. In FIGS. 1A and 11, the first calculation unit 91 generates chronological pixel data D1 illustrated in FIG. 2. The first calculation unit 91 calculates, for the chronological pixel data D1, an average data D2 (smoothed data) which is obtained by calculating a simple moving average for a predetermined number (for example, 21) of frames, where the predetermined number is smaller than K. M pieces of the average data D2 are calculated for respective M pieces of the chronological pixel data D1 illustrated in FIG. 2 (step S1).

The first calculation unit 91 calculates M pieces of the difference data D3 for respective M pieces of the chronological pixel data D1 by using M pieces of the chronological pixel data D1 and M pieces of the average data D2 calculated in step S1 (step S2).

Among the M pieces of the difference data D3, pixels corresponding to the pieces of the difference data D3 having a large waveform amplitude constitute a gas candidate image (an example of a predetermined region). The gas candidate image is a candidate for a gas image. The extraction unit 94 extracts a gas candidate image based on the M pieces of the difference data D3 calculated in step S2 (step S3). This will be described below.

Figure 12:
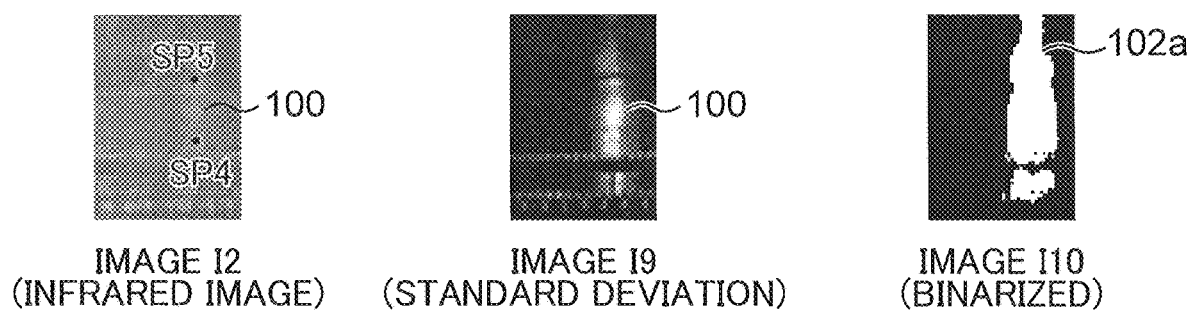
FIG. 12 is a view in which the image I2, an image I9, and an image I10 are compared.

FIG. 12 is a view in which the image I2, an image I9, and an image I10 are compared. The image I2 is the image I2 illustrated in FIG. 4. The image I9 and the image I10 are used for the processing for extracting a gas candidate image. For example, the extraction unit 94 illustrated in FIG. 1A calculates, from data obtained by calculating the standard deviation for all the 300 frames, the standard deviation data D4 of the difference data D3 in FIG. 10. The image presented by the standard deviation data D4 is the image I9 illustrated in FIG. 12. Note that, the extraction unit 94 may perform different processing such as calculating a moving standard deviation for every predetermined number of frames less than 300 (for example, about 20 frames) and summing up the calculated moving standard deviations.

The image I9 is generated based on the image I2. The value of each of the pixels constituting the image I9 indicates the standard deviation. The image I9 is visualization of the standard deviation. The standard deviation data D4 presents the object image 100 and the gas image (not shown)

more clearly than the difference data D3. An image formed of pixels having a standard deviation exceeding a predetermined threshold is a gas candidate image. The image I10 is created by binarizing the value (standard deviation) of each pixel constituting the image I9 using the predetermined threshold. A gas candidate image 102a appears in a position overlapping the object image 100. The extraction unit 94 binarizes each of the M pieces of the standard deviation data D4 using the threshold.

Figure 13:
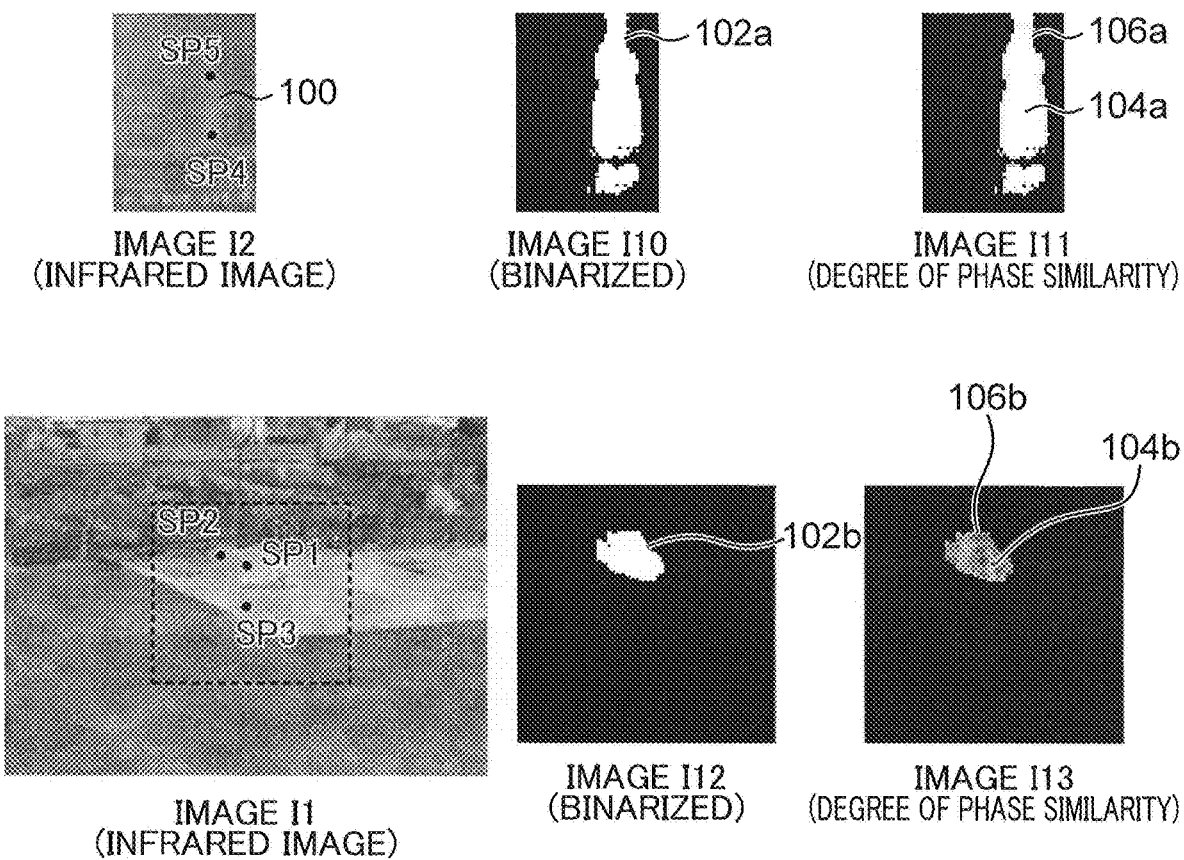
FIG. 13 is a view in which the image I1, the image I2, the image I10, an image I11, an image I12, and an image I13 are compared.

As illustrated in FIGS. 1A and 11, the second calculation unit 92 calculates the degree of phase similarity of the gas candidate image (step S4). This will be described below. FIG. 13 is a view in which the image I1, the image I2, the image I10, the image I11, the image I12, and the image I13 are compared. The image I2 and the image I10 are respectively the image I2 and the image I10 illustrated in FIG. 12. The image I11 is visualization of the degree of phase similarity of the gas candidate image 102a.

The image I1 is the image I1 illustrated in FIG. 3. The image I12 and the image I13 correspond to the region inside the dotted line in the image I1. Similar to the image I10, the image I12 is subjected to the processing performed in step S3 and includes the gas candidate image 102b. Similar to the image I11, the image I13 is visualization of the degree of phase similarity.

The second calculation unit 92 determines a single reference pixel 104 (104a, 104b) from all the pixels that constitute the gas candidate image 102 (102a, 102b) extracted in step S3. For example, the second calculation unit 92 determines, among all the pixels constituting the gas candidate image 102, the pixel having the maximum standard deviation as the reference pixel 104, and determines, among all the pixels, pixels other than the reference pixel 104 as comparison pixels (not shown). The number of the comparison pixels is N.

The second calculation unit 92 calculates the degree of phase similarity between the waveform of the difference data D3 of the reference pixel 104 and the waveform of the difference data D3 of the first comparison pixel. The second calculation unit 92 calculates the degree of phase similarity using the NCC. The difference data D3 is an example physical-quantity-change data. The second calculation unit 92 calculates the degree of phase similarity of the difference data D3 for the rest of the comparison pixels (second to N-th comparison pixels) in the same manner. Describing this calculation for the second comparison pixel, for example, the second calculation unit 92 calculates the degree of phase similarity between the waveform of the difference data D3 of the reference pixel 104 and the waveform of the difference data D3 of the second comparison pixel.

Figure 14:
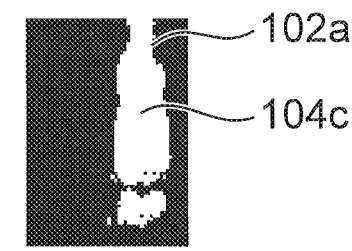
FIG. 14 illustrates another example reference pixel.
Figure 15:
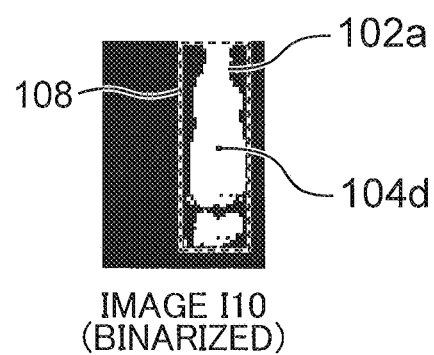
FIG. 15 illustrates yet another example reference pixel.

The image I11 and the image I13 illustrated in FIG. 13 is an example image of visualization of the degree of phase similarity calculated in the manner described above. Note that, the reference pixel 104 is not limited to the pixel having the maximum standard deviation. FIG. 14 illustrates another example reference pixel 104 (104c). FIG. 15 illustrates yet another example reference pixel 104 (104d). As in FIG. 14, the pixel located at the gravity center of the gas candidate image 102a (a predetermined region) may be determined as the reference pixel 104c. As in FIG. 15, the pixel located at the center of a circumscribed quadrangle 108 may be determined as the reference pixel 104d. The circumscribed quadrangle 108 is a rectangle surrounding the gas candidate image 102a (the predetermined region) and has four sides which are each tangent to the gas candidate image 102a.

As in the image I11 and the image I13 in FIG. 13, the pixel is closer to white for a higher degree of phase similarity (closer to 1) and is closer to black for a lower degree of phase similarity (closer to −1). An image 106a included in the image I11 is shown in white, indicating a high degree of phase similarity. The image 106a corresponds to an object reflecting the sunlight. An image 106b included in the image I13 is shown in gray, indicating a low degree of phase similarity. The image 106b corresponds to the gas image.

As illustrated in FIGS. 1A and 11, the determination unit 95 determines whether the gas candidate image 102 (an image including the reference pixel 104 and the comparison pixels) extracted in step S3 is a noise (step S5). In more detail, if the degree of phase similarity of the gas candidate image 102 extracted in step S3 exceeds a predetermined reference, the determination unit 95 determines that the gas candidate image 102 is not a gas image but an image generated by a factor other than gas (for example, a light reflected on the object, a heat reflected on the object, or a stray light occurring in the optical system 4 of the infrared camera 2 illustrated in FIG. 1A) and that the gas candidate image 102 is a noise. In such a manner, the determination unit 95 determines that the gas candidate image 102 that has a degree of phase similarity exceeding the predetermined reference is not a gas image.

If the degree of phase similarity is not higher than the predetermined reference, the determination unit 95 determines that the gas candidate image 102 is not a noise (may be determined as a gas image).

For example, the determination unit 95 determines that the gas candidate image 102 is a noise if the percentage of the pixels having the degree of phase similarity higher than 0.7 among all the pixels constituting the gas candidate image 102 is larger than 60%, and that the gas candidate image 102 is not a noise if the percentage is 60% or smaller.

A major effect of the embodiment will now be described. As in FIG. 13, the degree of phase similarity of an image of an object reflecting the sunlight or heat from the heat source (an image 106a included in the image I11) is high and the degree of phase similarity of a gas image (an image 106b included in the image I13) is low. Thus, it can be determined based on the degree of phase similarity that the image including the reference pixel 104 and the comparison pixels (the gas candidate image 102) is not a gas image. The image-processing device 3 for gas detection according to the embodiment determines, based on the degree of phase similarity, that the image including the reference pixel 104 and the comparison pixels is not a gas image. This improves accuracy of gas detection.

The processing for extracting a gas candidate image 102 (step S3 in FIG. 11) is not limited to the processing described above. The gas candidate image 102 may be extracted by a known processing (for example, JP 2012-58093 A, which is a prior art document) or the processing described below.

Figure 16:
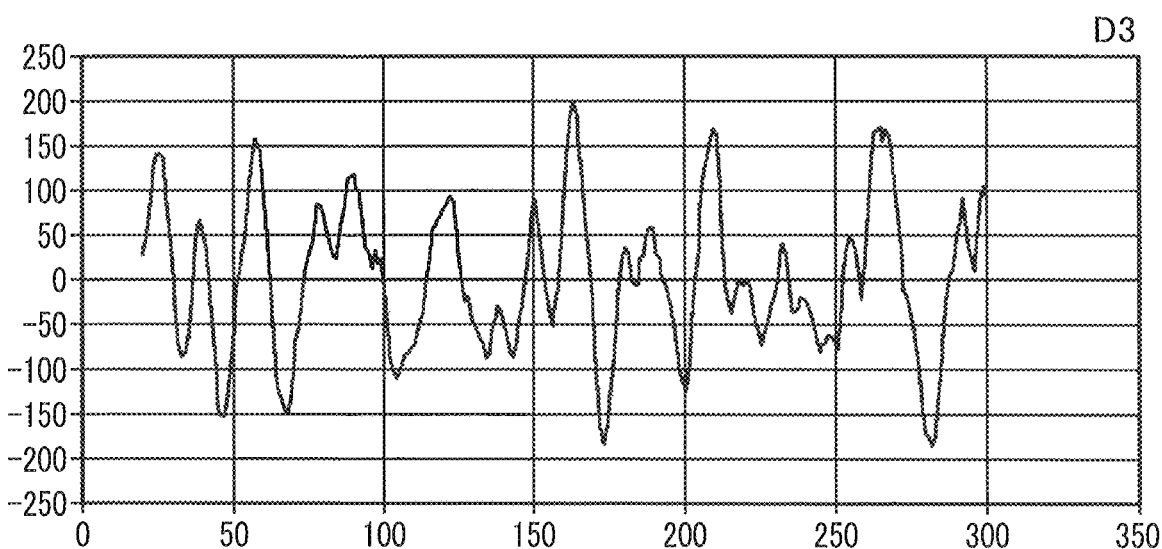
FIG. 16 is a chart illustrating difference data D3.
Figure 17:
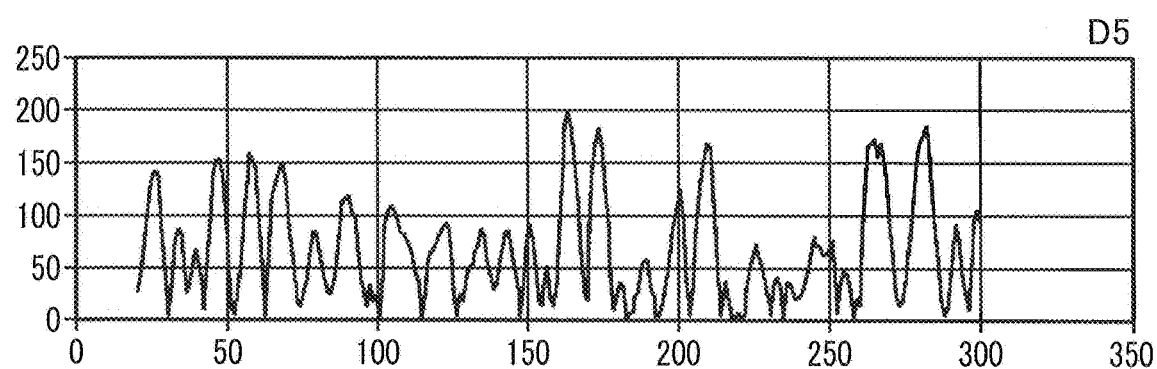
FIG. 17 is a chart illustrating absolute value data D5.

The extraction unit 94 calculates, for example, absolute value data D5, which is the absolute value of the difference data D3 in FIG. 16 obtained in step S2 in FIG. 11 (for example, see FIG. 17). In the charts illustrated in FIGS. 16 and 17, the vertical axis and the horizontal axis are respectively the same as the vertical axis and the horizontal axis of the chart illustrated in FIG. 5.

Figure 18:
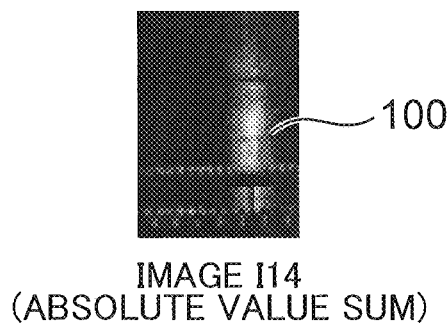
FIG. 18 illustrates an image I14.

The extraction unit 94 calculates the absolute-value-sum data D6 by, for example, taking the sum of the absolute value data D5 for all the frames (300 frames) in FIG. 17. An example of the image presented by the absolute-value-sum data D6 is the image I14 illustrated in FIG. 18.

The image I14 is generated based on the image I2 illustrated in FIG. 4. The value of each of the pixels constituting the image I14 is the sum of absolute values, which is indicated by the absolute-value-sum data D6. The image I14 is visualization of the sum of absolute values. The absolute-value-sum data D6 presents the object image 100 and the gas image (not shown) more clearly than the difference data D3. An image formed of pixels having the sum of absolute values exceeding a predetermined threshold is the gas candidate image 102.

A modification of the image-processing device 3 for gas detection according to the embodiment will now be described. As illustrated in FIG. 11, the image-processing device 3 for gas detection according to the embodiment extracts a gas candidate image 102 (step S3) and determines whether the gas candidate image 102 is a noise (step S5). The modification does not extract the gas candidate image 102 but divides the image into a plurality of regions 110 each having a prescribed size (predetermined regions) and determines whether each of the regions 110 is a noise.

Figure 19:
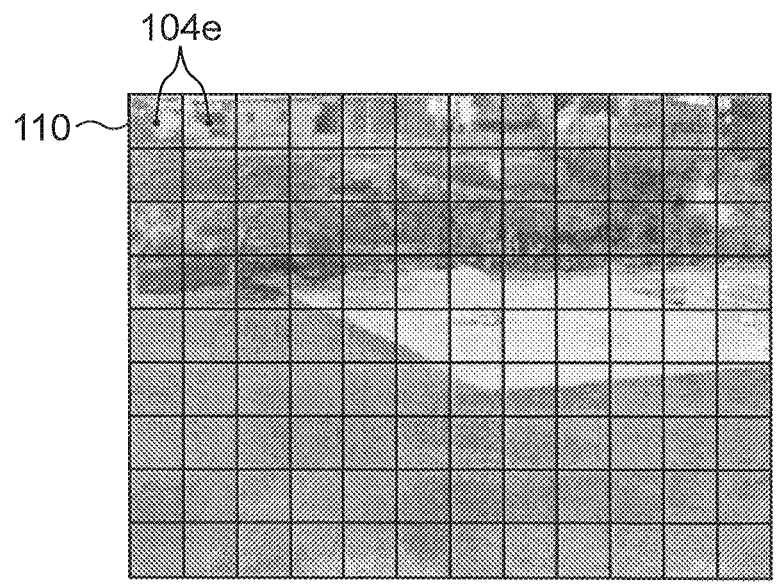
FIG. 19 is a view illustrating the image I1 and the image I2 each divided into a plurality of regions.
Figure 19:
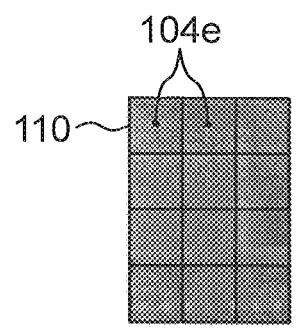
Figure 20:
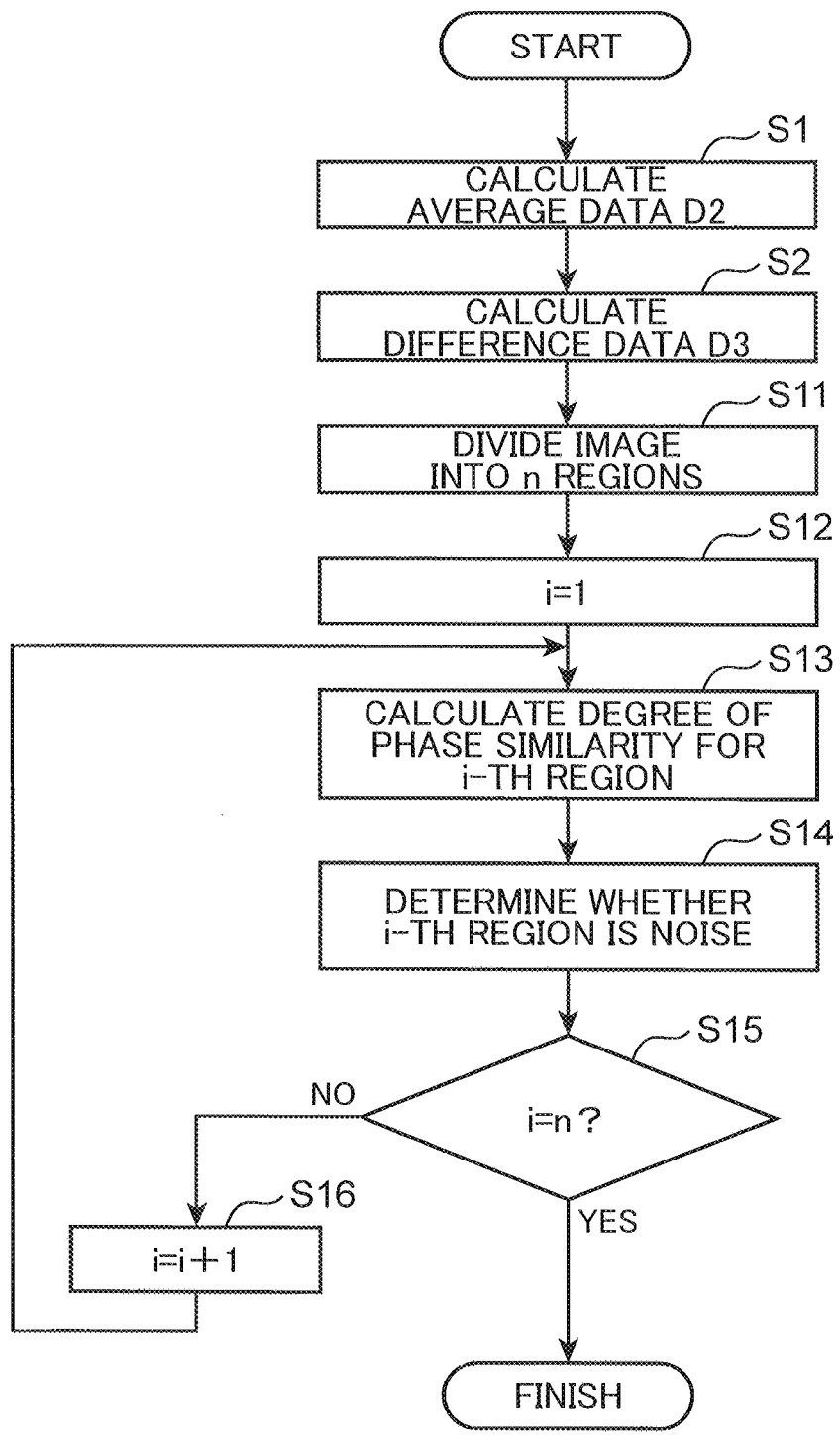
FIG. 20 is a flowchart describing an operation of a modification of the embodiment.

FIG. 19 is a view illustrating the image I1 and the image I2 each divided into a plurality of regions 110. The image I1 is the image I1 illustrated in FIG. 3. The image I2 is the image I2 illustrated in FIG. 4. FIG. 20 is a flowchart describing an operation of the modification of the embodiment. Processing performed in step S1 is the same as the processing performed in step S1 in FIG. 11. Processing performed in step S2 is the same as the processing performed in step S2 in FIG. 11.

As illustrated in FIG. 19, the image processing unit 9 (see FIG. 1A) divides the image I1 and the image I2 each into n regions 110 (a plurality of regions) (step S11).

The image processing unit 9 sets i to 1 (step S12), and calculates the degree of phase similarity of the first region 110 taking the pixel in the center of the region 110 as a reference pixel 104e (step S13). The modification calculates the degree of phase similarity for the region 110 instead of the gas candidate image 102. The processing by which the degree of phase similarity is calculated is the same as the processing performed in step S4 in FIG. 11. The reference pixel 104e is not limited to the pixel located in the center of the region 110.

The image processing unit 9 determines whether the first region 110 indicates a noise (step S14). Determination is made in the same way as in step S5 in FIG. 11.

The image processing unit 9 determines whether "i=n" is satisfied (step S15). If "i=n" is not satisfied (No in step S15), the image processing unit 9 sets i to (i+1) (step S16) and performs the processing in step S13.

If "i=n" is satisfied (Yes in step S15), that is, if the processing in step S14 has been performed on the n-th region 110 (the last one of the regions 110), the image processing unit 9 ends the operation of the modification.

Figure 21:
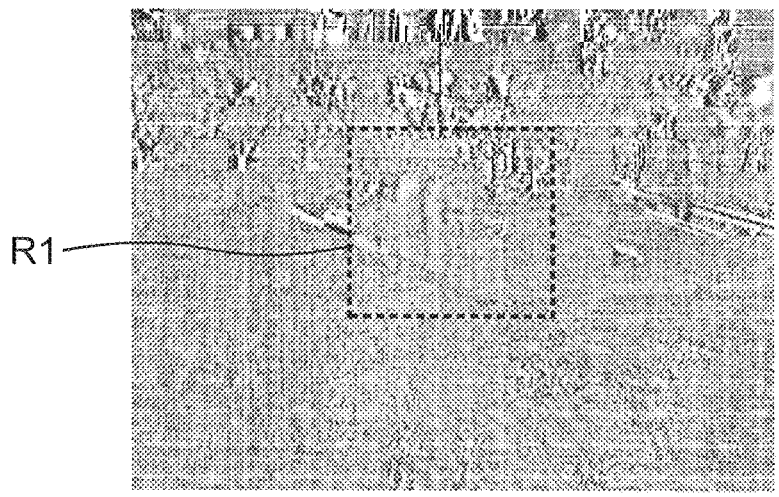
FIG. 21 is a view in which an image I15 and an image I16 are compared.
Figure 21:
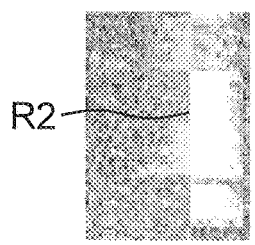

FIG. 21 is a view in which an image I15 and an image I16 are compared. The image I15 corresponds to the image I1 illustrated in FIG. 19. The value indicated by each of the pixels constituting the image I15 is the degree of phase similarity. The image I16 corresponds to the image I2 illustrated in FIG. 19. The value indicated by each of the pixels constituting the image I16 is the degree of phase similarity. Each of the image I15 and the image I16 is visualization of the degree of phase similarity for the first to n-th regions 110 calculated in step S13.

As in the image I15 and the image I16, the pixel is closer to white for a higher degree of phase similarity and is closer to black for a lower degree of phase similarity. A region R1 where gas comes out is shown in gray, indicating a low degree of phase similarity. An image in a region R2 where an object is located is shown in white, indicating a high degree of phase similarity.

In the modification, the degree of phase similarity is calculated for all the divided regions 110 (step S13). The present invention is not limited thereto. The image-processing device 3 for gas detection may perform the processing of extracting the gas candidate image 102, described with reference to FIG. 11, for all the plurality of divided regions 110 (step S3: if the gas candidate image 102 is larger than the region 110, a portion of the gas candidate image 102 is extracted), and perform the processing in step S13 and step S14 on the gas candidate image 102 or an extracted portion of the region 110.

In the embodiment and the modification, the degree of phase similarity is calculated for all the pixels constituting the gas candidate image 102 or the region 110. However, it is not necessary to calculate the degree of phase similarity for all the pixels. For example, the degree of phase similarity may be calculated for every two pixels along the vertical and horizontal directions. Alternatively, the degree of phase similarity may be calculated for two separately located pixels among all the pixels constituting the gas candidate image 102 or the region 110. Calculating the degree of phase similarity for a smaller number of pixels accelerates the processing in step S4 in FIG. 11 and the processing in step S13 in FIG. 20.

In the embodiment and the modification, the second calculation unit 92 calculates the degree of phase similarity of the waveforms of the difference data D3 (step S4 in FIG. 11 and step S13 in FIG. 20). The present invention is not limited thereto. The second calculation unit 92 may calculate the degree of phase similarity of the waveforms of other physical-quantity-change data (for example, the chronological pixel data D1). In the modification, if the second calculation unit 92 calculates the degree of phase similarity of the waveform of the chronological pixel data D1, calculation of the average data D2 (in step S1) and calculation of the difference data D3 (in step S2) are not necessary.

Summary of Embodiments

An image-processing device for gas detection according to a first aspect of the embodiment that realizes the above object is an image-processing device for gas detection that performs image processing on infrared images of a subject being taken at a plurality of times of day, the image-processing device including a first calculation unit that generates physical-quantity-change data indicating chronological change in physical quantity determined based on pixel data of pixels constituting the infrared image, a second calculation unit that selects, from the pixels constituting the infrared image, a reference pixel used as a reference and a comparison pixel to be compared with the reference pixel, and calculates a degree of phase similarity indicating a degree of similarity in phase between a waveform of the physical-quantity-change data of the reference pixel and a waveform of the physical-quantity-change data of the comparison pixel, and a determination unit that determines, based on the degree of phase similarity, that an image including the reference pixel and the comparison pixel is not a gas image.

The present inventor has compared the waveforms of physical-quantity-change data of pixels constituting a gas image and found out that the waveforms have no similarity in phase. The present inventor has also compared the waveforms of physical-quantity-change data of pixels of an image of an object reflecting the sunlight or an object reflecting heat from a heat source and found out that the waveforms have similarity in phase. The degree of phase similarity is high for the image of the object reflecting the sunlight or heat from a heat source, whereas the degree of phase similarity is low for the gas image. Thus, it can be determined based on the degree of phase similarity that an image including the reference pixel and the comparison pixels is not a gas image. The image-processing device for gas detection according to the first aspect of the embodiment determines, based on the degree of phase similarity, that an image including the reference pixel and the comparison pixels is not a gas image. This improves accuracy of gas detection. The physical quantity is, for example, brightness or temperature. The degree of phase similarity can be calculated using, for example, normalized cross correlation.

For example, the determination unit performs determination in a manner described below. The determination unit determines that an image is not a gas image if the degree of phase similarity is higher than a prescribed value. When a plurality of degrees of phase similarity is calculated for a plurality of comparison pixels, and if the percentage of the degrees of phase similarity higher than a prescribed value is larger than a prescribed second value, the determination unit determines that an image is not a gas image.

In the configuration described above, the first calculation unit generates chronological pixel data indicating the chronological change in the pixel data of the infrared image, generates smoothed data by smoothing the chronological pixel data over the course of the chronological change, and generates difference data indicating the difference between the chronological pixel data and the smoothed data as the physical-quantity-change data.

The difference data indicates a fluctuation component of the waveform. It can be easily determined whether the waveforms are similar or dissimilar in phase by comparing fluctuation components. This is how the degree of phase similarity is calculated in this configuration. The waveform of the difference data preferably crosses zero (namely, has a positive maximum value and a negative minimum value).

In the configuration described above, the second calculation unit calculates the degree of phase similarity between the reference pixel and the comparison pixel selected among the pixels constituting a predetermined region included in the infrared image.

If the distance between the reference pixel and the comparison pixel is too far, the determination based on the degree of phase similarity has low accuracy. In this configuration, accuracy of the determination can be raised by focusing the subject, which is to be determined based on the degree of phase similarity, on a predetermined region instead of the entire infrared image.

In this configuration, the image-processing device for gas detection further includes an extraction unit that performs predetermined image processing on the infrared image to extract a gas candidate image, which is a candidate for a gas image, and the second calculation unit calculates the degree of phase similarity using the gas candidate image as the predetermined region.

In this configuration, the gas candidate image is taken as the predetermined region. The gas candidate image can be extracted by the processing as described below in (a) and (b).

(a) The infrared images of the subject being taken at a plurality of times of day constitute data including a plurality of chronologically arranged frames. The extraction unit calculates standard deviation data for each of the pixels constituting the infrared image and extracts the gas candidate image based on the standard deviation. The standard deviation data is calculated by calculating the standard deviation for the difference data across a predetermined number of frames.

(b) The infrared images of the subject being taken at a plurality of times of day constitute data including a plurality of chronologically arranged frames. The extraction unit calculates absolute value data, which indicates the absolute value of the difference data, for each of the pixels constituting the infrared image, calculates absolute-value-sum data for the absolute value data, and extracts the gas candidate image based on the absolute-value-sum data. The absolute-value-sum data is calculated by taking the sum of absolute value data for a predetermined number of frames.

In the configuration described above, the second calculation unit sets the region, which is defined by dividing the infrared image into regions each having a prescribed size, as the predetermined region, and calculates the degree of phase similarity.

In this configuration, the region defined by dividing the infrared image into regions each having a prescribed size is the predetermined region.

In the configuration described above, the second calculation unit sets the reference pixel and calculates the degree of phase similarity. The reference pixel is the pixel located at the center of the rectangle surrounding the predetermined region, the pixel located at the gravity center of the predetermined region, or the pixel having the maximum indicating value among the pixels constituting the predetermined region.

The reference pixel may be (1) the pixel located at the center of the rectangle surrounding the predetermined region, (2) the pixel located at the gravity center of the predetermined region, or (3) the pixel having the maximum indicating value among the pixels constituting the predetermined region. The pixel indicates a value such as brightness, temperature, standard deviation indicated by the standard deviation data, or the sum of absolute values indicated by the absolute-value-sum data.

In the configuration described above, the first calculation unit sets the region, which is defined by dividing the infrared image into regions each having a prescribed size, as the predetermined region, and calculates the degree of phase similarity.

In this configuration, the difference data is not used as the physical-quantity-change data. The reference pixel may be one of (1) to (3) described above.

An image-processing method for gas detection according to a second aspect of the embodiment is an image-processing method for gas detection that performs image processing on infrared images of a subject being taken at a plurality of times of day, the image-processing method including a calculating step of generating physical-quantity-change data that indicates chronological change in physical quantity determined based on pixel data of pixels constituting the infrared image, selecting, from the pixels constituting the infrared image, a reference pixel used as a reference and a comparison pixel to be compared with the reference pixel, and calculating a degree of phase similarity indicating a degree of similarity in phase between a waveform of the physical-quantity-change data of the reference pixel and a waveform of the physical-quantity-change data of the comparison pixel, and a determining step of determining, based on the degree of phase similarity, that an image including the reference pixel and the comparison pixel is not a gas image.

The image-processing method for gas detection according to the second aspect of the embodiment is a method of realizing the image-processing device for gas detection according to the first aspect of the embodiment and has an effect similar to that of the image-processing device for gas detection according to the first aspect of the embodiment.

An image-processing program for gas detection according to a third aspect of the embodiment is an image-processing program for gas detection that performs image processing on infrared images of a subject being taken at a plurality of times of day, the image-processing program causing a computer to execute a calculating step of generating physical-quantity-change data that indicates chronological change in physical quantity determined based on pixel data of pixels constituting the infrared image, selecting, from the pixels constituting the infrared image, a reference pixel used as a reference and a comparison pixel to be compared with the reference pixel, and calculating a degree of phase similarity indicating a degree of similarity in phase between a waveform of the physical-quantity-change data of the reference pixel and a waveform of the physical-quantity-change data of the comparison pixel, and a determining step of determining, based on the degree of phase similarity, that an image including the reference pixel and the comparison pixel is not a gas image.

The image-processing program for gas detection according to a third aspect of the embodiment is a program that realizes the image-processing device for gas detection according to the first aspect of the embodiment and has an effect similar to that of the image-processing device for gas detection according to the first aspect of the embodiment.

An image-processing device for gas detection according to a fourth aspect of the embodiment includes a storage device that stores infrared images of a subject being taken at a plurality of times of day, and a processor configured to generate physical-quantity-change data that indicates chronological change in physical quantity determined based on pixel data of pixels constituting the infrared image, select, from the pixels constituting the infrared image, a reference pixel used as a reference and a comparison pixel to be compared with the reference pixel, calculate a degree of phase similarity indicating a degree of similarity in phase between a waveform of the physical-quantity-change data of the reference pixel and a waveform of the physical-quantity-change data of the comparison pixel, and determine, based on the degree of phase similarity, that an image including the reference pixel and the comparison pixel is not a gas image.

The image-processing device for gas detection according to the fourth aspect of the embodiment is a processor that realizes the image-processing device for gas detection according to the first aspect of the embodiment and has an effect similar to that of the image-processing device for gas detection according to the first aspect of the embodiment.

This application is based on Japanese Patent Application No. 2016-113306 filed on 7 Jun. 2016, the entire content of which is incorporated herein.

The present invention is described in a suitable and sufficient manner through the embodiments with reference to the drawings as described above. It should be noted that a person skilled in the art can easily alter and/or modify the embodiments. It should be construed that such alterations and modifications made by a person skilled in the art all fall within the scope of the claims unless deviation of such alterations and modifications is beyond the scope of the claims.

INDUSTRIAL APPLICABILITY

According to the present invention, an image-processing device for gas detection, an image-processing method for gas detection, and an image-processing program for gas detection are provided.

The invention claimed is:

1. An image-processing device for gas detection that performs image processing on infrared images of a subject taken at a plurality of times of day, the image-processing device comprising:
a hardware processor that:
generates physical-quantity-change data indicating chronological change in a physical quantity based on pixel data of the infrared images,
selects a first spot and a second spot in the infrared images, and
determines, based on phase information of a waveform of the physical-quantity-change data in the first spot and phase information of a waveform of the physical-quantity-change data in the second spot, whether or not an image including the first spot and the second spot in the infrared images is a gas image.

2. The image-processing device for gas detection according to claim 1, wherein the hardware processor generates:
chronological pixel data indicating the chronological change in the pixel data of the infrared images,
smoothed data by smoothing the chronological pixel data over a course of the chronological change, and
the physical-quantity-change data based on difference data indicating differences between the chronological pixel data and the smoothed data.

3. The image-processing device for gas detection according to claim 1, wherein the hardware processor:
sets a region for determining whether or not the gas image is in the infrared images,
selects the first spot and the second spot in the region, and
determines whether or not the region is the gas image.

4. The image-processing device for gas detection according to claim 3, wherein the hardware processor:
performs image processing on the infrared images to extract a gas candidate image, which is a candidate for the gas image,
sets the gas candidate image as the region, and
determines whether or not the gas candidate image is the gas image.

5. The image-processing device for gas detection according to claim 2, wherein:
the infrared images of the subject taken at a plurality of times of day constitute data including a plurality of chronologically arranged frames; and
the hardware processor:
calculates standard deviation data for each of pixels constituting the infrared images, the standard deviation data being calculated by calculating the standard deviation for the difference data across a predetermined number of frames,
extracts a gas candidate image, which is a candidate for the gas image, based on the standard deviation,
selects the first spot and the second spot in the gas candidate image, and
determines whether or not the gas candidate image is the gas image.

6. The image-processing device for gas detection according to claim 2, wherein:
the infrared images of the subject taken at a plurality of times of day constitute data including a plurality of chronologically arranged frames; and
the hardware processor:
calculates absolute value data, which indicates the absolute value of the difference data, for each of pixels constituting the infrared images, calculates absolute-value-sum data for the absolute value data, the absolute-value-sum data being calculated by taking a sum of the absolute value data for a predetermined number of frames, extracts a gas candidate image, which is a candidate for the gas image, based on the absolute-value-sum data, selects the first spot and the second spot in the gas candidate image, and determines whether or not the gas candidate image is the gas image.

7. The image-processing device for gas detection according to claim 3, wherein the hardware processor sets, as the region, one of a plurality of regions defined by dividing the infrared image into regions each having a prescribed size.

8. The image-processing device for gas detection according to claim 3, wherein the hardware processor defines the first spot as a specific reference position, which is a center of a rectangle surrounding the region.

9. The image-processing device for gas detection according to claim 3, wherein the hardware processor defines the first spot as a specific reference position, which is a gravity center position of the region.

10. The image-processing device for gas detection according to claim 3, wherein the hardware processor defines the first spot as a specific reference position, which is a spot including a pixel indicating a maximum value among pixels constituting the region.

11. An image-processing method for gas detection that performs image processing on infrared images of a subject taken at a plurality of times of day, the image-processing method comprising:

generating physical-quantity-change data that indicates chronological change in a physical quantity based on pixel data of the infrared images; and determining, based on phase information of a waveform of the physical-quantity-change data in a first spot and phase information of a waveform of the physical-quantity-change data in a second spot respectively selected in the infrared images, whether or not an image including the first spot and the second spot in the infrared images is a gas image.

12. A non-transitory recording medium storing an image-processing program for gas detection to perform image processing on infrared images of a subject taken at a plurality of times of day, the image-processing program, when executed by a computer, causing the computer to perform operations comprising:

generating physical-quantity-change data that indicates chronological change in a physical quantity based on pixel data of the infrared images; and determining, based on phase information of a waveform of the physical-quantity-change data in a first spot and phase information of a waveform of the physical-quantity-change data in a second spot respectively selected in the infrared images, whether or not an image including the first spot and the second spot in the infrared images is a gas image.

13. An image-processing device for gas detection comprising:

a storage that stores infrared images of a subject being taken at a plurality of times of day; and a processor configured to generate physical-quantity-change data that indicates chronological change in a physical quantity based on pixel data of the infrared images, select a first spot and a second spot in the infrared images, and determine, based on phase information of a waveform of the physical-quantity-change data in the first spot and phase information of a waveform of the physical-quantity-change data in the second spot, whether or not an image including the first spot and the second spot in the infrared images is a gas image.

14. The image-processing device for gas detection according to claim 3, wherein the hardware processor determines whether or not the region is the gas image for each of a plurality of regions.

15. The image-processing device for gas detection according to claim 8, wherein the hardware processor selects a plurality of second spots with respect to the specific reference position.

16. The image-processing device for gas detection according to claim 1, wherein the hardware processor:

calculates a degree of phase similarity indicating a degree of similarity in phase between the waveform of the physical-quantity-change data in the first spot and the waveform of the physical-quantity-change data in the second spot, and determines, based on the degree of phase similarity, whether or not the image including the first spot and the second spot in the infrared images is the gas image.

17. The image-processing device for gas detection according to claim 16, wherein the hardware processor calculates, as the degree of phase similarity, a normalized cross correlation between the waveform of the physical-quantity-change data in the first spot and the waveform of the physical-quantity-change data in the second spot.

* * * * *